(12) United States Patent
Li

(10) Patent No.: US 9,832,647 B1
(45) Date of Patent: Nov. 28, 2017

(54) SYSTEMS AND METHODS FOR KEYWORD- AND LOCATION-BASED USER AUTHENTICATION

(71) Applicant: ShenZhen Life Essentials Technology Limited, Guangdong (CN)

(72) Inventor: Ang Li, Guangdong (CN)

(73) Assignee: SHENZHEN LIFE ESSENTIALS TECHNOLOGY LIMITED, Guangdong (CN)

( * ) Notice: Subject to any disclaimer, the term of this patent is extended or adjusted under 35 U.S.C. 154(b) by 0 days.

(21) Appl. No.: 15/651,722

(22) Filed: Jul. 17, 2017

(51) Int. Cl.
| | |
|---|---|
| *H04W 74/00* | (2009.01) |
| *H04W 12/06* | (2009.01) |
| *H04W 4/02* | (2009.01) |
| *H04W 4/20* | (2009.01) |
| *H04M 1/725* | (2006.01) |
| *A63F 13/73* | (2014.01) |
| *A63F 13/79* | (2014.01) |

(52) U.S. Cl.
CPC ............ *H04W 12/06* (2013.01); *A63F 13/73* (2014.09); *A63F 13/79* (2014.09); *H04M 1/72544* (2013.01); *H04W 4/023* (2013.01); *H04W 4/206* (2013.01)

(58) Field of Classification Search
CPC .............................. G06Q 30/0267; H04W 4/02
USPC ...................... 463/37, 40, 29; 715/728, 201; 705/14.36, 80, 14.23, 14.73, 14.54, 14.53, 705/7.29; 709/203; 455/456.3, 417
See application file for complete search history.

(56) References Cited

U.S. PATENT DOCUMENTS

| | | | | |
|---|---|---|---|---|
| 2007/0030824 | A1* | 2/2007 | Ribaudo | G01S 5/0018 370/328 |
| 2013/0014136 | A1* | 1/2013 | Bhatia | H04N 21/252 725/9 |
| 2013/0324262 | A1* | 12/2013 | Shimohata | H04W 4/008 463/42 |

* cited by examiner

*Primary Examiner* — Kiet Doan
(74) *Attorney, Agent, or Firm* — Kwan & Olynick LLP

(57) ABSTRACT

Systems and methods for keyword— and location-based user authentication are disclosed. An example method includes, detecting a user request by a first user to complete a gaming task; detecting a user acceptance by a second user to accept the gaming task; tracking a first plurality of locations of the first user; tracking a second plurality of locations of the second user; obtaining a first keyword through a first user device associated with the first user; obtaining a second keyword through a second user device associated with the second user; authenticating the first user in accordance with the second keyword and the first plurality of locations; authenticating the second user in accordance with the first keyword and the second plurality of locations; and deeming the gaming task completed in accordance with authenticating the first user and authenticating the second user.

20 Claims, 9 Drawing Sheets

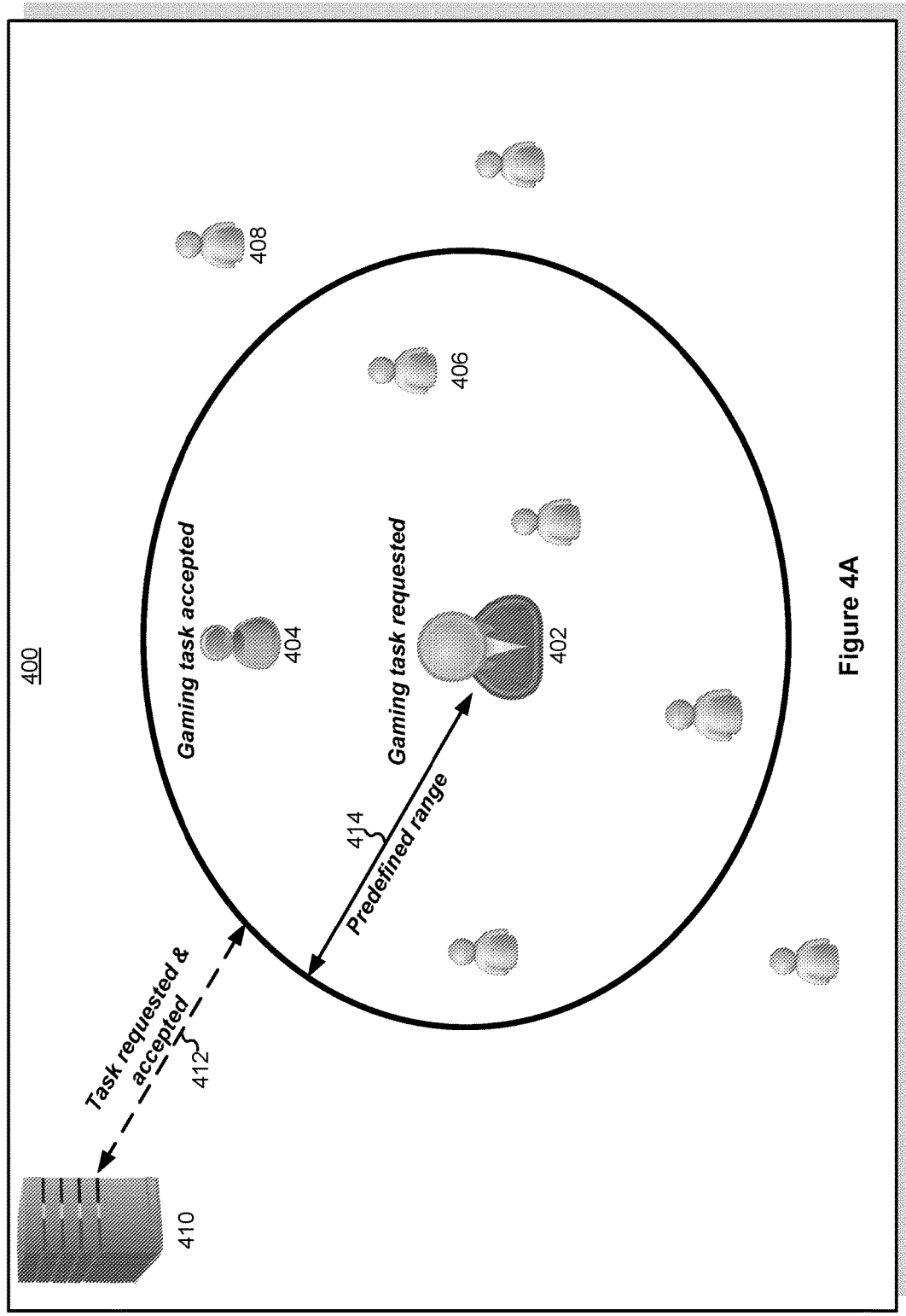

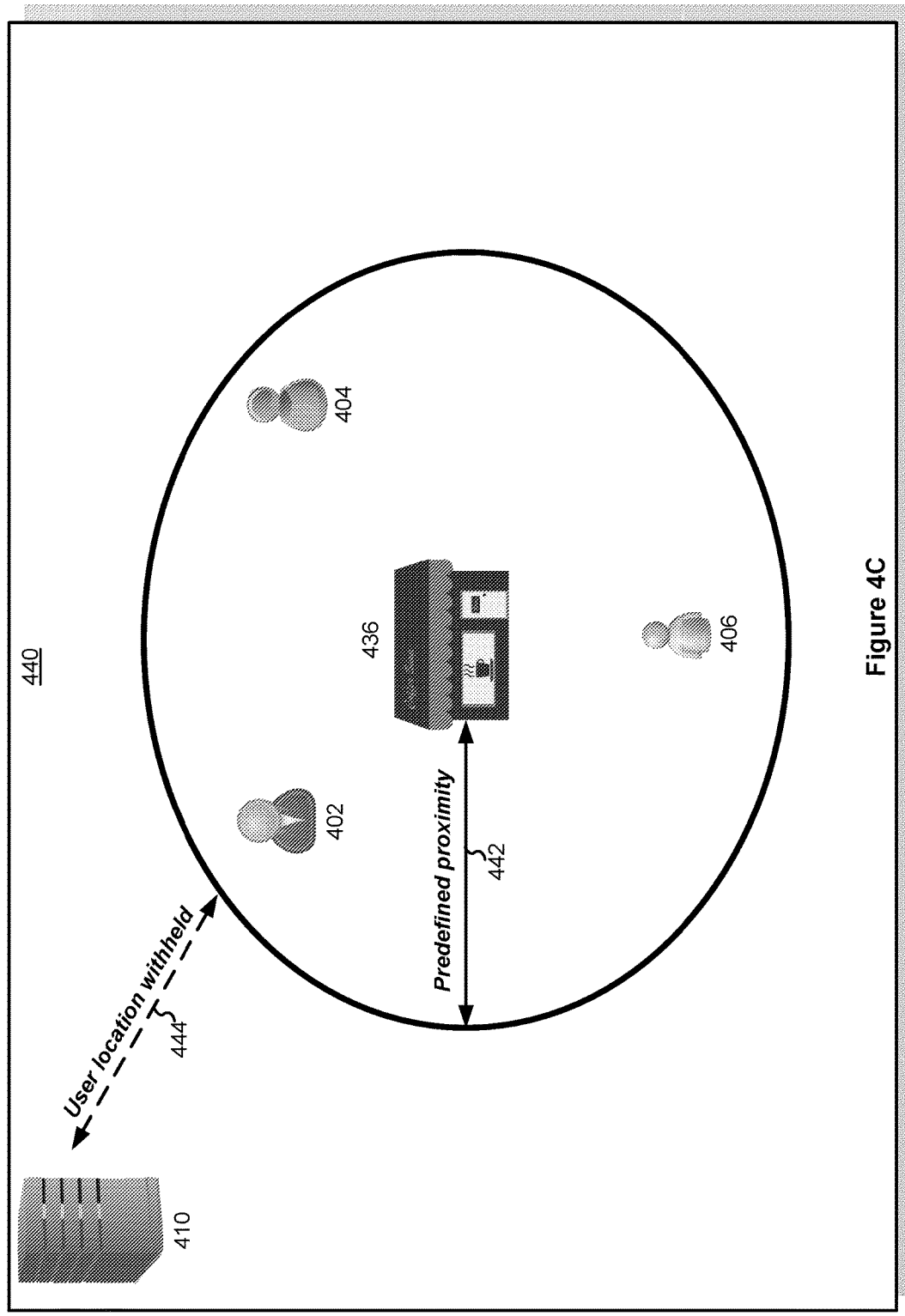

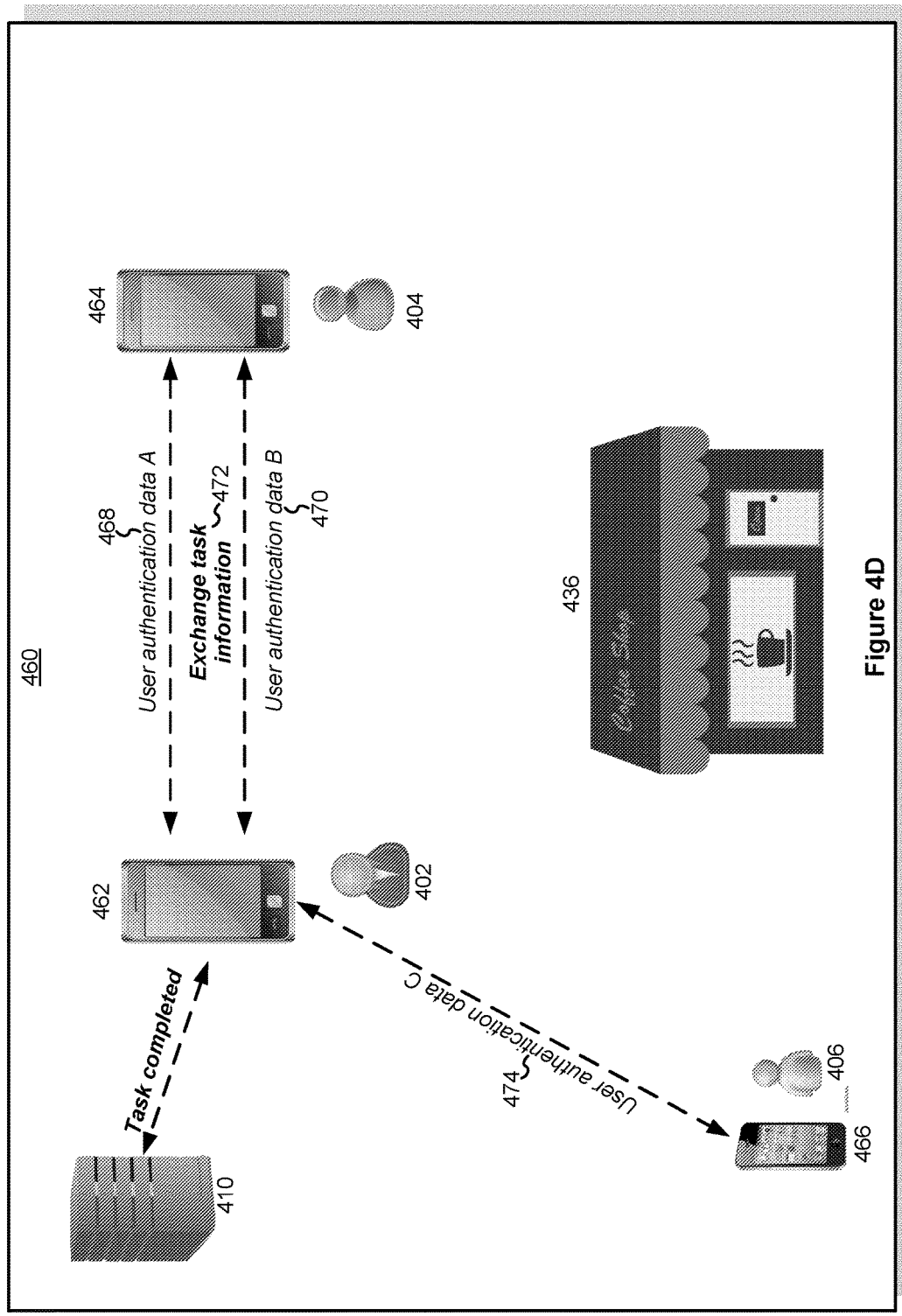

SYSTEMS AND METHODS FOR KEYWORD- AND LOCATION-BASED USER AUTHENTICATION

TECHNICAL FIELD

The present disclosure relates generally to user authentication and more specifically to keyword— and location-based user authentication.

BACKGROUND

A user may need to frequently authenticate herself in order to conduct electronic transactions. For example, a user may need to use her fingerprint to activate a mobile payment system; for another example, a user may need to enter a unique identification number into a mobile app in order to login.

Difficulties abound for balancing user convenience against security, however. One technical problem is that a single-factor authentication is susceptible to fraud. For example, anyone knowing the unique identification number may be able to authenticate herself, fraudulently, as the user in the mobile app. Another technical problem is that a multi-factor authentication often requires more user efforts (e.g., requiring a user to gather inputs from several different devices or application). For example, to log into a work email account on a work computer, a user may need to retrieve a security token from her smartphone in addition to providing a login name and a corresponding password.

The above identified technical problems are reduced or eliminated by the systems and methods disclosed in the present disclosure.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 4A is a block diagram illustrating example steps for selecting two users for engaging in a gaming task in accordance with some implementations.

FIG. 4C is a block diagram illustrating example steps for determining whether two users involved in a gaming task are proximate to each other in accordance with some implementations.

FIG. 4D is a block diagram illustrating example steps for authenticating two users involved in a gaming task in accordance with some implementations.

SUMMARY

Figure 1:
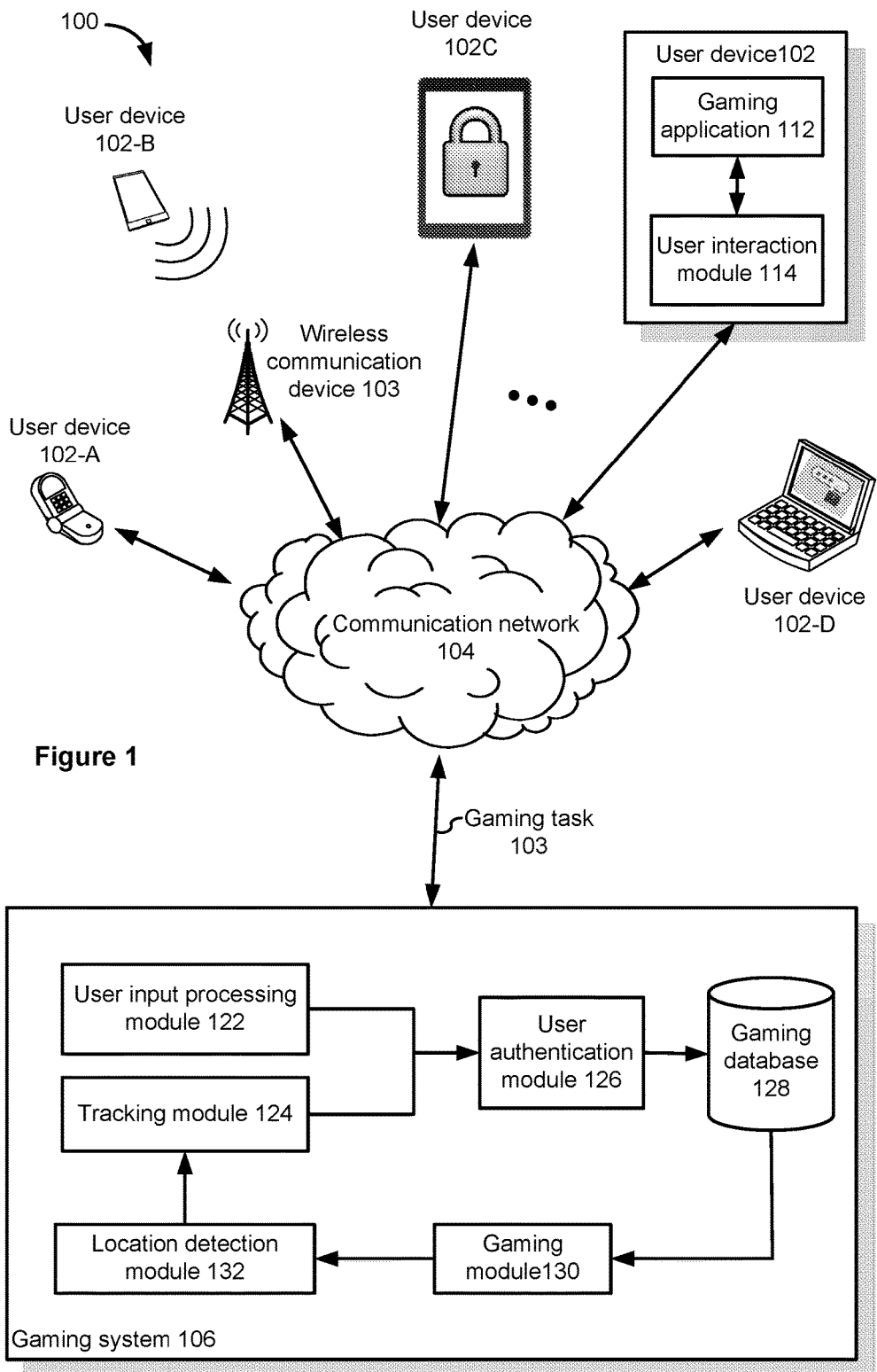
FIG. 1 is a block diagram illustrating an example computing system in accordance with some implementations.

Technical solutions (e.g., computing systems, methods, and non-transitory computer readable storage mediums) for keyword- and location-based user authentication are provided in the present disclosure.

A method for authenticating a user, in some implementations, includes, at a computing device, detecting a user request by a first user to complete a gaming task; detecting a user acceptance by a second user to accept the gaming task; tracking a first plurality of locations of the first user; tracking a second plurality of locations of the second user; obtaining a first secrete message through a first user device associated with the first user; obtaining a second secrete message through a second user device associated with the second user; authenticating the first user in accordance with the second secrete message and the first plurality of locations; authenticating the second user in accordance with the first secrete message and the second plurality of locations; and deeming the gaming task completed in accordance with authenticating the first user and authenticating the second user.

Obtaining the first secrete message through the first user device associated with the first user, in some implementations, includes: wirelessly transmitting the first secrete message, from the second user device, to the first user device.

Wirelessly transmitting the first secrete message, from the second user device, to the first user device, in some implementations, includes transmitting the first secrete message through a BLUETOOTH connection between the first user device and the second user device or through transmitting optical data such as applying Optical Character Recognition (OCR) techniques to a photo or capturing a Quick Response (QR) Code displayed on one of the devices.

The gaming task, in some implementations, includes requesting the first user and the second user to proceed to a same geographical location.

The first user proceeding to the same geographical location, in some implementations, includes a route along the first plurality of locations.

The method, in some implementations, further comprises: selecting the same geographical location from a plurality of predefined geographical locations in accordance with one or more system-defined criteria.

The method, in some implementations, further comprises: selecting the same geographical location, from a group of geographical locations, based on determining that the same geographical location is within a predefined proximity to a location associated with the user request.

The method, in some implementations, further comprises: identifying the first secrete message based on voice data provided to the first user device by the second user.

The gaming task, in some implementations, specifies that the first user performs a predefined action that requires participation by the second user.

The method, in some implementations, further comprises: selecting the second user, from a group of users, based on determining that the second user is within a predefined proximity to the first user.

In other aspects of the present disclosure, computing systems and non-transitory computer storage mediums for executing one or more steps of the above-described methods are also disclosed.

DETAILED DESCRIPTION

The implementations described in the present disclosure provide various technical solutions to improving user authentication techniques and in particular to the above-identified problems by providing techniques for keyword— and location-based user authentication.

As an example, after user A logs into an online gaming system, the gaming system may ask user A to complete a gaming task, which involves interacting in-person, e.g., face to face, with another user of the gaming system, user B. If user A agrees to participate in the gaming task, the gaming system selects a designated location within a predefined proximity from user A's current location, for example, a Chinese restaurant that is less than 10 miles away from user A's home, where user A logged into the gaming system. The gaming system may then invite another user, user B, who is within a predefined distance from the designated location, e.g., no more than 5 miles from the Chinese restaurant, to join user A in completing the gaming task. Once user B agrees to participate in the gaming task with user A, the gaming system instructs both users A and B to meet at the designated location.

The gaming system may track both users' movements and communicate each user's movement on a real-time basis or on a predefined time interval, e.g., 2 minutes, to the other user. This can ensure that users A and B are informed of each other's movements and current progress. When two users become close to the destination location, e.g., within 1 mile from the Chinese restaurant, the gaming system may withhold each user's movement or location information from the other user. The gaming system may, however, communicate visual or other cues to the users, e.g., a photo of a user's baseball cap to the other user, to help users recognize one another.

The users may attempt to authenticate themselves with the gaming system, once they meet each other in person. The first level of authentication may include authentication by countersigns. For example, user A may say to user B "today's chicken is well-cooked," to which user B is expected to reply "that's KFC." When users A and B exchange these phrases and receive expected answers (also referred to as countersigns in the present disclosure), they proceed to the next level of authentication, authentication by secrete messages. For example, user A may use a BLUETOOTH connection between her smartphone and user B's smartphone to wirelessly transmit a secrete message ("Flash") to user B; and user B may transmit a different secrete message (e.g., "Thunder") back to user A. The gaming system may then authenticate users A and B as the users who agreed to participate in the gaming task in accordance with these two secrete messages.

Providing at least these technical effects, the proposed technical solutions described in the present disclosure can reduce or eliminate the above-identified technical problems in at least the following ways.

First, data that can be used towards authenticating a user can be collected passively, and thus without requiring affirmative user actions, and applied to a user authentication process. Second, multi-factor authentications can be provided with reduced user inputs. Third, online gaming techniques can be applied towards real world scenarios, for example, by asking online gamers to create or participate in real world events as part of completing an online gaming task. These techniques can therefore not only reduce user efforts otherwise needed, but also enhance user gaming experience.

Additional details of implementations are now described in relation to the Figures.

FIG. 1 is a block diagram illustrating an example computing system 100 in accordance with some implementations.

The computing system 100, in some implementations, includes one or more user devices 102 (e.g., user devices 102A, 102B, 102C, and 102D), a communication network 104, and a gaming system 106. In some implementations, a user device 102 is a smartphone, a virtual reality headset, a mobile gaming console, a tablet, or a laptop computer.

A user device 102, in some implementations, hosts a gaming application 112 and enables a user to interact with the gaming application 112 through a user interaction module 114. For example, a user may, through the user interaction module 114, log into the gaming application 112 and ask to be assigned a series of gaming tasks.

The gaming application 112 may include a video gaming application, a virtual reality gaming application, an augmented reality gaming application, or a combination thereof. For example, the gaming application 112 may ask two users to meet at the liquor aisle of a WHOLE FOODS grocery store and conduct a 3-way conversation with a virtual liquor-expert enabled on the users' gaming applications 112. The gaming application 112 may include a POKEMON GO game app or the like.

The user interaction module 114 may enable a user to interact with the gaming application 112. For example, the user interaction module 114 may collect text, voice, image, or video data from a user or the user's surrounding areas and provide the collected data to the gaming application 112. The user interaction module 114 may also provide gaming feedback to a user, e.g., whether a user's secrete message has successfully authenticated the user in the gaming application 112.

The communication network 104, in some implementations, interconnects one or more user devices 102 with each other, and with the gaming system 106. In some implementations, the communication network 104 optionally includes the Internet, one or more local area networks (LANs), one or more wide area networks (WANs), other types of networks, or a combination of such networks. The communication network 104 may transmit data between a user device 102 and the gaming system 106 using a wireless communication device 103, for example, a cellular tower or a Wi-Fi hotspot.

The gaming system 106, in some implementations, includes a user input processing module 122, a tracking module 124, a user authentication module 126, a gaming database 128, a gaming module 130, and a location detection module 132.

The gaming system 106, in some implementations, creates a gaming task 103 that requires the participation of at least two users and verifies that these two users complete the gaming task based on several authentication factors. For example, as part of a gaming task, the gaming system 106 asks users A and B to meet at a nearby movie theater and exchange secrete messages when they meet in person, e.g., which kind of movie each user favors the most. The gaming system may consider the gaming task completed (1) when users A and B's locations are within less than 10 feet from each other and less than 30 feet from the known location of the movie theater and (2) when users A and B provide to the gaming system the correct secrete messages about which kind of movie the other user favors the most.

The user input processing module 122 may process user inputs received from the user device 102 and provide the processed user inputs to the user authentication module 126 for user authentication purpose. For example, the user input processing module 122 may apply one or more Optical Character Recognition (OCR) techniques to a photo transmitted from the user device 102 to the gaming system 106 to identify the characters captured in the photo (e.g., "Movie") and provide the identified characters to the user authentication module 126. For another example, the user input processing module 122 may apply one or more transcription techniques to voice data transmitted by the user device 102 to the gaming system 106 to identify the characters (e.g., the letter "I"), words (e.g., the word "love"), and phrases (e.g., "I like love movies") included in the voice data and provide the identified characters, words, or phrases to the user authentication module 126.

The tracking module 124 may track user actions or locations and provide the tracking data to the user authentication module 126 for user authentication purpose. For example, the tracking module 124 may identify the GPS locations of a user device 102 every five minutes and provide the tracked locations to the user authentication module 126. For another example, the tracking module 124 may track gero-movements of a user device 102 and provide the tracked movements to the user authentication module 126.

The user authentication module 126 may determine whether to authenticate a user based on data provided by the tracking module 124, data provided by the user input processing module 122, or both. For example, the user authentication module 126 may determine, based on a secret messages (e.g., "I like skating") provided by a user to the user device 102, whether a user is who she claims to be. For another example, the user authentication module 126 may determine, based on a voice pattern (e.g., a high pitch for letter O and a low pitch for letter K) identified from voice data provided by a user to the user device 102, whether a user is who she claimed to be. The user authentication module 126 may also determine whether a user is a computerized/programmed robot or a real person user. For example, because completing an assigned gaming task may require two users to move from two different originations to the same destination, a single user cannot log into two different devices to try to complete the gaming task. These technologies would help identify and eliminate robot users, similar to the functionality of a CAPCHA challenge.

The gaming database 128 may store and maintain gaming data, for example, gaming tasks, users involved in a gaming task, designated locations where a gaming task may be completed, countersigns or secrete messages relating to a gaming task. In some implementations, a countersign includes a sign, word, or any other signal previously agreed to by or known to all users involved in a gaming tasks and required to be exchanged between these users as part of completing the gaming task; a secret message includes a sign, word, or any other signal known by no more than one user, among two or more users, involved in a gaming task.

At the beginning of a gaming task, the gaming system 106, in some implementations, generates a set of countersigns for selection by users. The gaming system 106 may generate the countersigns randomly or in accordance with the gaming profiles of the two or more users involved in in the gaming task. The users may select the countersigns from the set before beginning the gaming task. For example, if a user has completed 10 gaming tasks simulating undercover military operations in a war zone, then the gaming system 106 may provide famous phrases in war movies (e.g., "SAVING PRIVATE RYAN") to the user as countersigns. For another example, if a user has indicated in her user profile that she holds a Ph.D. in Chinese literatures, then the gaming system may provide phrases from famous Chinese poems (e.g., "Before my bed, the moon is shining bright").

Similarly, the gaming system 106, in some implementations, generates a set of secrete messages for selection by users. The gaming system 106 may generate the secrete messages randomly or in accordance with the gaming profiles of the two or more users involved in in the gaming task. The users may select secrete messages from the set before beginning the gaming task. For example, if a user has indicated in her user profile that she is a practicing lawyer, then the gaming system may provide legal jargons, e.g., "hang jury" or "motion denied," as secrete messages.

The gaming system 106 may also generate countersigns and secrete messages based on system preferences, e.g., advertiser's preferences. For example, an advertising sponsor may provide keywords relating to their trademarks (e.g., "NIKE") or slogans (e.g., "JUST DO IT") to the gaming system 106 as potential countersigns or secrete messages. Advertising sponsors may also bid for having their messages or phrases provided to users as countersigns or secrete messages.

These technologies are technically advantageous, because allowing users to selecting countersigns or secrete message can make the in-person interaction process more interesting and interactive. Users may use countersigns or secrete messages of their own choosing to add a more personal touch to an online game, enhancing gaming experience. Game sponsors may also take advantage of this process by supplying countersigns or secrete messages relevant to the sponsors, e.g., in order to promote their business operation or message.

The gaming module 130 may create a gaming task, track the status of a pending gaming task, and assign user experience levels or gaming privileges according to gaming tasks completed by a user. For example, the gaming module 130 may assign a user, a power gamer status, and grant more gaming privileges to a power gamer, e.g., a right of first refusal to join a gaming task initiated by another power gamer or a large number of clues about how to completing a gaming task.

The location detection module 132 may determine or estimate, based on location data collected from a user device 102, the location of a user associated with the user device 102. For example, the location detection module 132 may use GPS locations of a smartphone to determine the locations of a registered user of the smartphone; the location detection module 132 may also use cell tower triangulation techniques to approximate the locations of a registered user of a smartphone.

Figure 2:
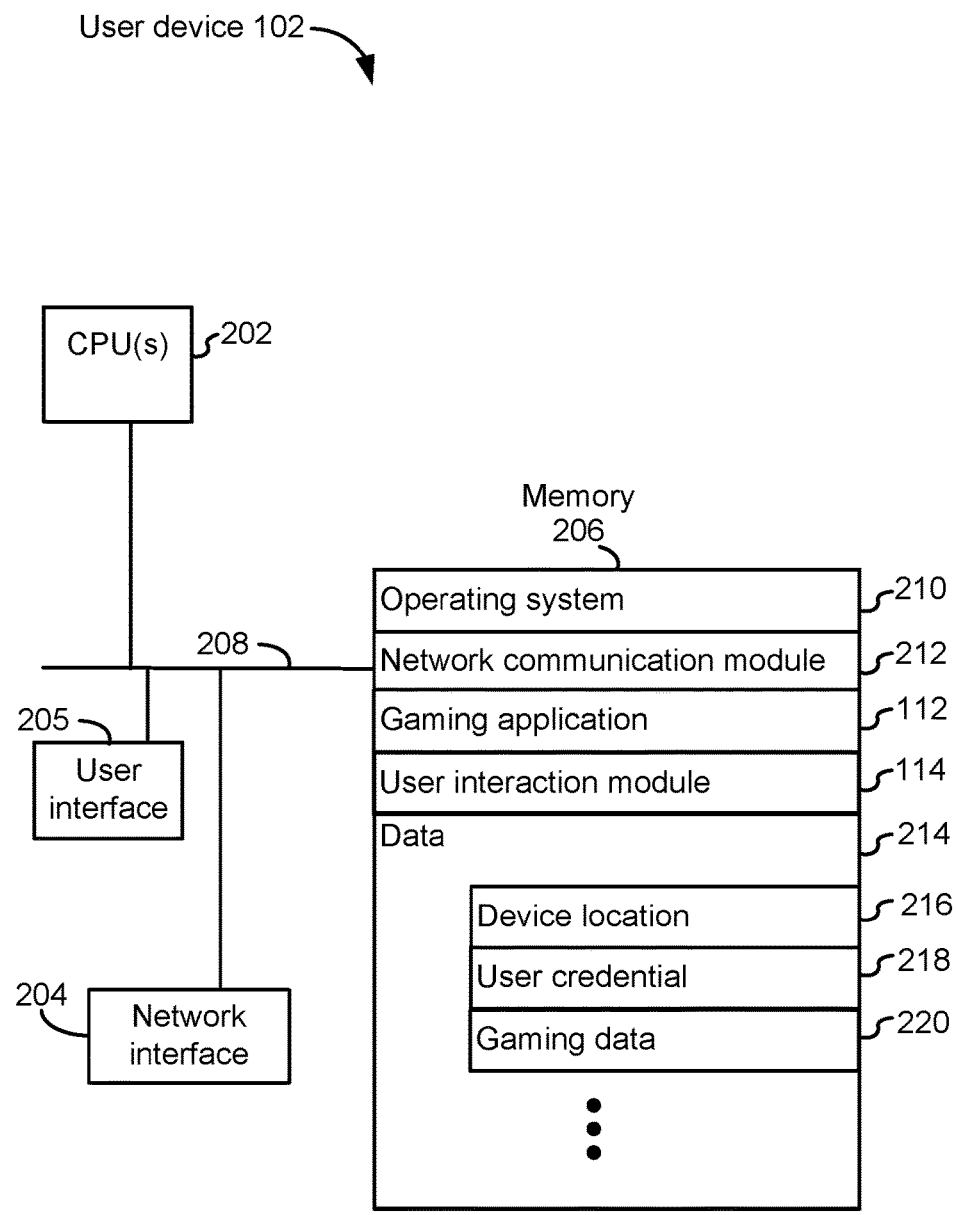
FIG. 2 is a block diagram illustrating an example user device in accordance with some implementations.

FIG. 2 is a block diagram illustrating an example user device 102 in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

an operating system 210, which includes procedures for handling various basic system services and for performing hardware dependent tasks;

a network communication module (or instructions) 212 for connecting a user device 102 with other devices (e.g., the gaming system 106 and user devices 102B, 102C, and 102D) via one or more network interfaces 204 (wired or wireless) or the communication network 104 (FIG. 1);

a user interface module 214 for displaying, e.g., in the gaming application 112, user interface components or controls (e.g., textbox, button, radio button, drop-down list) to a user;

a gaming application 112, e.g., a game application that requires users to take real world actions in order to complete a gaming task, such as travelling from a user's current location to a designated location and collects a countersign as well as a secrete message from another user near the designated location;

a user interaction module 114 for enabling a user to interact with a gaming application 112, e.g., providing input to the gaming application 112 and receiving feedback from the gaming application 112; and data 214, which may include:
- one or more device locations 216, e.g., the GPS locations of a user device 102, such as a smartphone, in the past 5 minutes;
- one or more user credentials 218, e.g., a username and password pair for logging into a gaming application 112 or a user's fingerprint data for authenticating the user in a gaming application; and
- gaming data 220, e.g., the status of a pending gaming task, a list of past completed tasks, and current gaming privileges of a user.

In some implementations, the user interface 205 includes an input device (e.g., a keyboard, a mouse, a touchpad, a track pad, and a touch screen) for a user to interact with the user device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
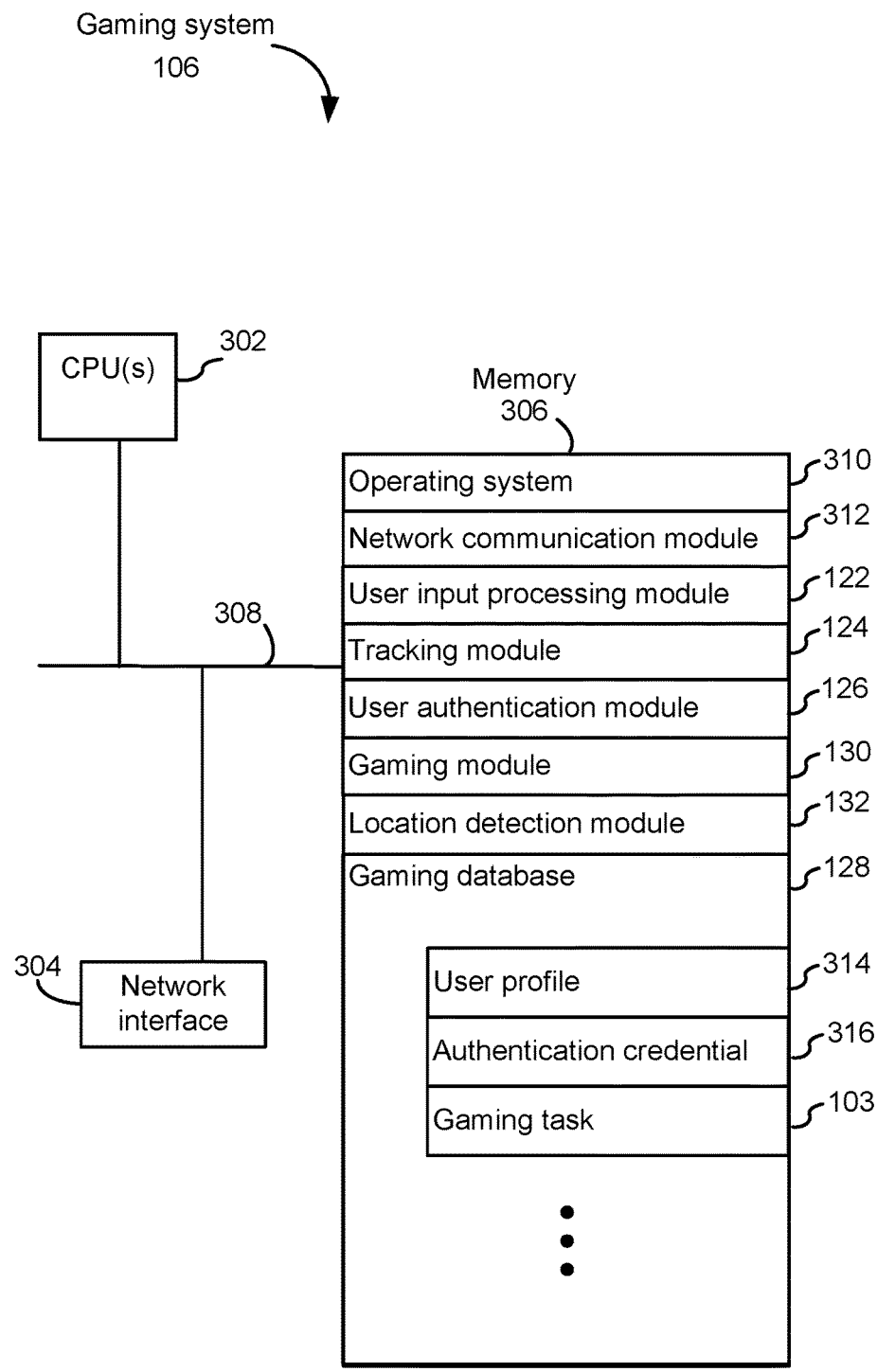
FIG. 3 is a block diagram illustrating an example gaming system in accordance with some implementations.

FIG. 3 is a block diagram illustrating an example gaming system 106 in accordance with some implementations. The gaming system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting a gaming system 106 with other devices (e.g., a user devices 102) via the one or more network interfaces 304 (wired or wireless) or the communication network 104 (FIG. 1);

a user input processing module 122 for processing user inputs received from a user device 102 and providing the processed user input to a user authentication module 126 for user authentication purpose;

a tracking module 124 for tracking user data (e.g., user actions or locations) and provide the tracking data to the user authentication module 126 for user authentication purpose;

a user authentication module 126 for determining whether to authenticate a user based on data provided by the tracking module 124 and data provided by the user input processing module 122;

a gaming module 130 for determining the status of a gaming task and assigning user experience levels or gaming privileges;

a location detection module 132 for estimating, based on location data collected from a user device 102, the location of a user using the user device 102; and a gaming database 128 for maintaining and storing data including:
- one or more user profiles 314, e.g.., age, location, advertising preference, and preferred transportation means, of users of a gaming application 112;
- one or more authentication credentials 316, e.g., a countersign, a secrete message, a PIN, a username-password pair, of users of a gaming application 112; and
- one or more gaming tasks 103, e.g., asking a user to exchange a countersign and a secrete message with another user inside a furniture store within 2 miles from the user's current location.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "user device 102" and a "gaming system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

FIG. 4A is a block diagram 400 illustrating example steps for selecting two users for engaging in a gaming task in accordance with some implementations.

As shown in FIG. 4A, after logging into an online gaming application, user 402 may request a gaming system 410 to assign her a gaming task, e.g., meeting and retrieving a predefined secrete message from another user at a nearby location. In response, the gaming system 410 may determine the current location of the user 402 based on the GPS location of user 402's smartphone and then select a location near user 402's current location (e.g., a coffee shop that within 20 minutes travel time away from user 402's current location). The gaming system 410 may select a second user to participate in the gaming task with the user 402. For example, the gaming system 410 may select user 404 who is within a predefined range (e.g., 20 miles) from user 402 or from the selected coffee shop. In some implementations, the predefined range is determined based on distance (e.g., 2 miles, 5 miles, or 50 miles); in other implementations, the predefined range is determined based on real time traffic condition and travel time needed in view thereof. The latter may provide a better idea of how much user efforts are likely needed in order to complete a gaming task, as distance alone may not accurately reflect the user efforts needed to complete a gaming task. For example, driving 1-mile on a high-congested highway may take much more user efforts than cycling 2 miles on lightly-travelled country road.

In some implementation, user 404 is selected from a plurality of users, based on user profile associated with the plurality of users, e.g., age, sex, height, weight, marital status, professional or personal interests, and educational background of user 402. Using not only proximity, but also user profile to select potential gaming participants is technically advantageous, as it will likely enhance gaming experience. For example, asking two users with common interests in detective novel to play a detective-suspect game in front of a police station will likely to be more enjoyable to the participants, than asking these two users to play a Shakespeare scene.

After selecting user 404, e.g., from a plurality of users meeting the distance or travel time requirements, the gaming system 410 transmits gaming data to user 404 and requests that user 404 accepts the gaming task. If the user 404 accepts the gaming task, the gaming system 410 considers the gaming task requested and accepted and may begin tracking the movements of the users 402 and 404, e.g., to ensure that the users, and now game participants, are making progress towards completing the gaming task. If the user 404 declines to participate in the assigned gaming task, the gaming system 410 may select another user meeting the distance or travel time requirements, e.g., user 406, and requests that user 406 accepts the gaming task.

Figure 4B:
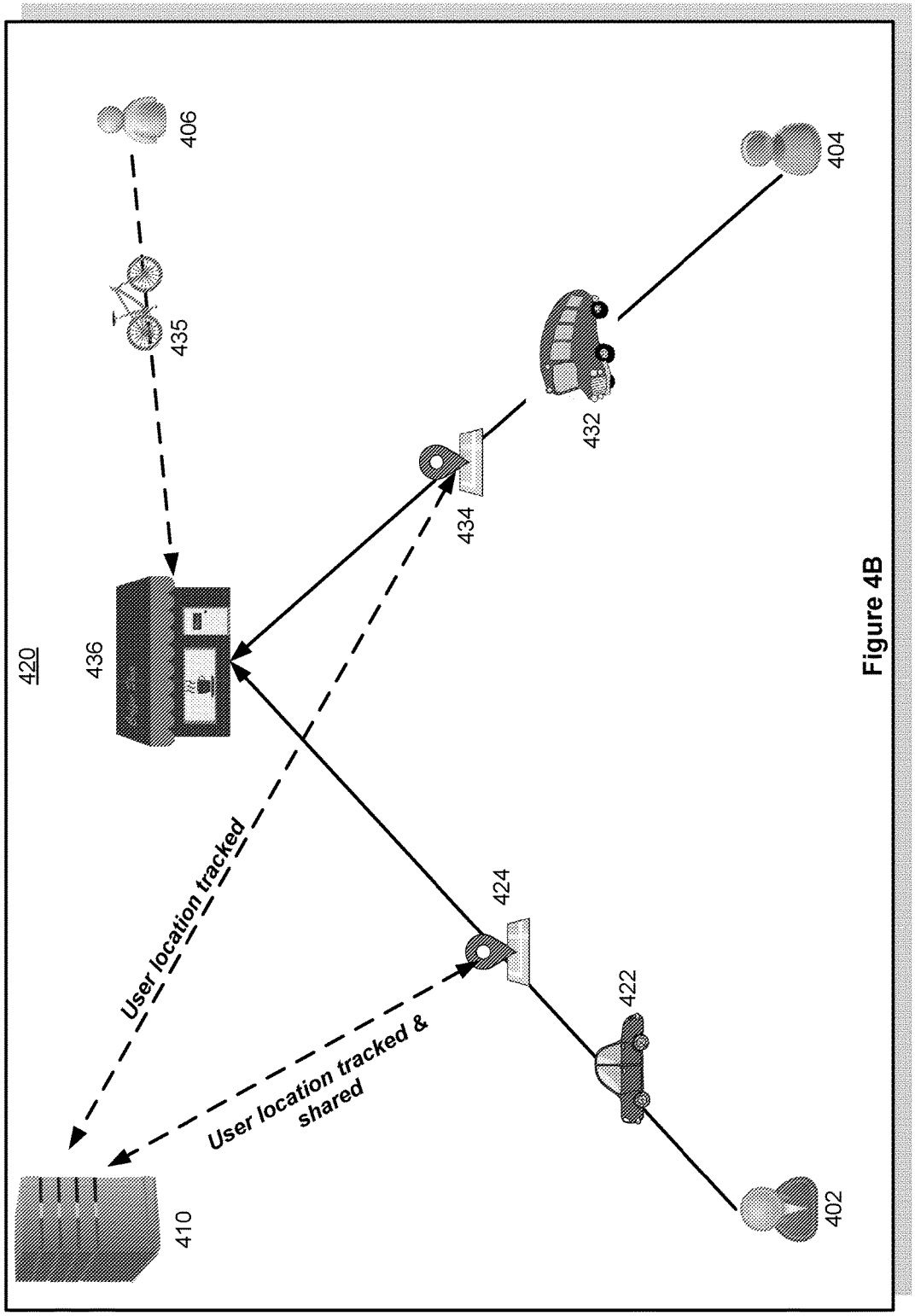
FIG. 4B is a block diagram illustrating example steps for tracking user locations while two users completing a gaming task in accordance with some implementations.

FIG. 4B is a block diagram 420 illustrating example steps for tracking user locations while two users completing a gaming task in accordance with some implementations.

As shown in FIG. 4B, having accepted the gaming task, users 402 and 404 begin travelling to the designated meeting location, a coffee shop 436. Users 402 and 404 may use different travel means, for example, as shown in FIG. 4B, user 402 is traveling to the coffee shop 436 using a passenger car 422, while user 404 is traveling to the coffee shop 436 using a bus 432. The gaming system 410 may track the locations of users 402 and 404, e.g., locations 424 and 434 respectively, while they are travelling to the coffee shop 436 and share the tracked location data among users 402 and 404. For example, the user 402 may request a real-time location of the user 404 or a series of past locations of the user 404 from the gaming system 410, and vice versa. These technologies ensure that each game participant is made aware of other game participants' current progress and participation level; for example, a lack of movement after 20 minutes into a gaming task may indicate that a participant has stopped participating in the gaming task.

Note that the tracked locations of each user can provide data needed for a user authentication later. For example, because the gaming system 410 knows the original location of the user 402, e.g., the location where the user 402 accepted the gaming task, as well as the designated meeting location, the gaming system 410 may suggest a travel route to the user 402 for travelling from the original location to the designated meeting location. If the tracked locations of the user 402 correspond to locations along the suggested travel route, then the gaming system 410 may use these location matches as a basis to authenticate the user 402, for example, when user 402 requests a user authentication at the designated location. Conversely, if the travel route recorded from plurality of location points of user 402 does not correspond to known travel constraints, such as local speed limits or a user claiming to be riding a bicycle to a destination is detected as travelling at 70 miles an, the authentication in some implementations would fail.

In the implementations where a suggested route is not available or not provided, the gaming system 410 may use the tracked locations to determine whether the user 402 is travelling from the original location to the designated meeting location, for example, based on whether the user 402's tracked locations are becoming more proximate to the designated meeting location or whether the travel route undertaken by user 402 (as outlined by the tracked locations) is a reasonable travel route for travelling to the designated meeting location.

Using tracked user locations to authenticate a user at a future or different location is technically advantageous. Because using multiple data points, e.g., a user's varying locations at different time points, to authenticate a user will likely produce a strong authentication means, preventing fraudulent authentications. Further, a game participant is not required to affirmatively collect location data and provide the location data when attempting to authenticate herself. Instead, the gaming system 410 keeps track of a game participant's varying locations and automatically applies the tracked locations when the gaming participant attempts an authentication. These technologies enable a strong authentication mechanism without creating more burdens on a user.

For example, as shown in FIG. 4B, user 406 is also travelling, by bicycle 435, to the coffee shop 436. But because the travel route of user 406 differs from the travel route of user 402 and from the travel route of user 404, the gaming system may not authenticate the user 406 as the user 402, even when user 406 provides a personal identification number (PIN) or a username-password pair that belongs to user 402.

FIG. 4C is a block diagram 440 illustrating example steps for determining whether two users involved in a gaming task are proximate to each other in accordance with some implementations.

When users 404 and 406 are within a predefined proximity, e.g., 50 feet, 300 feet, or half a mile, to the designated location, e.g., the coffee shop 436, or to each other, the gaming system 410 may withhold the real-time location of the user 404 from the user 406 and vice versa. The gaming system 410 may, however, provide other clues to help one participant to recognize another participant. For example, the gaming system may provide a series of fashion clothing and apparel photos (e.g., photos showing LOUIS VUITTON products) to user 402 to suggest user 404's dressing taste or preference, e.g., luxury brands, as well as what user 404 might be wearing at that time.

The gaming system 410 may also provide gaming cues based on a user's gaming privilege. For example, the gaming system 410 may provide a larger number of clues or more explicit clues to a senior game participant, but a fewer number of clues or less explicit clues to a junior game participant.

The gaming system 410 may also provide gaming clues based on advertisers' preferences. For example, the gaming system 410 may provide a game participant, an adverting slogan (e.g., "LOVIN IT"), to imply that another gaming participant is near or inside a MCDONALD'S restaurant down the street block. For another example, the gaming system 410 may provide two game participants, a same PIZZA HUT free-soda coupon code, to suggest that the game participants meet each other inside a nearby PIZZA HUT restaurant and that the other participant might be the person having a soda drink. These technologies are advantageous, because they deliver promotional materials to game participants and ask the game participants to use the clues encoded in the promotion materials to solve a gaming task. The promotional materials are therefore integrated into a gaming task spontaneously, without diminishing gaming experience. This is compared with embedding advertisement photos into scenes of a video game or a virtual reality view, which may appear more intrusive and thus diminish gaming experience.

FIG. 4D is a block diagram 460 illustrating example steps for authenticating two users involved in a gaming task, in accordance with some implementations.

As part of completing a gaming task, users 402 and 404 may need to authenticate themselves with the gaming system 410. The authentication may include at least two levels of authentication: the first level includes authentication by countersigns; and the second level includes authentication by secrete messages.

In some implementation, the user authentications are conducted by exchanging countersigns, secrete messages, or both, at least partially, through user interactions. For example, user 402 may verbally inform user 404 the first part of a countersign pair, e.g., the phrase "nothing matters really," to which user 404 is supposed to reply with the second part of the countersign pair, e.g., the phrase "until I came." If user 404 in fact replies with the phrase "until I came," the first level of authentication may be considered successful.

A different, but also successful, first level of authentication may include (1) user 404 verbally informing user 402 the first part of the countersign pair, e.g., the phrase "nothing matters really"; and (2) user 402 replying with the phrase "until I came." As such, in some implementations, the identities of the users who provide a particular part of a countersign pair are irrelevant for authentication purpose. In some alternative implementations, however, the identities of the users who provide a particular part of a countersign pair are relevant. For example, in some implementations, in order for an authentication to be successful, user 402, but not user 404, is supposed to provide the phrase "nothing matters really"; and user 404, but not user 402, is supposed to reply with the phrase "until I came."

In some implementations, the user authentications are conducted by wirelessly exchanging countersigns, secrete messages, or both, between two or more different user devices. For example, user 402 may transmit the first part of a countersign pair (e.g., the phrase "nothing matters really"), or an encrypted version thereof, from her smartphone 462 to user 404's smartphone 464; and user 404 may transmit the second part of the countersign pair (e.g., the phrase "until I came"), or an encrypted version thereof, from her smartphone 464 to user 402's smartphone 462. In some implementations, receiving the first part of the countersign pair is a requisite for a user to transmit back the second part of the countersign pair. For example, the first part of the countersign pair is a key needed for the smartphone 464 to first decrypt the second part of the countersign pair and then transmit the second part of the countersign pair to the smartphone 462.

When users 402 and 404 clear the first level of authentication—authentication by countersigns, the gaming system 410 proceeds to the second level of authentication—authentication by secrete messages. Note that an authentication by secrete message process may differ from an authentication by countersign process, because both users 402 and 404 know the countersign pair, while, by definition, no user knows what secrete message another user holds.

Obtaining another game participant's secrete message and providing the secrete message to the gaming system 410 may suffice to authenticate a user before the gaming system 410 for the purpose of crediting the user as having completed the gaming task. For example, if the secrete message held by user 404 is the phrase "Job well done," and user 402 provides this phrase to the gaming system 410, the gaming system 410 may, in some implementations, determine that user 402 has completed the gaming task and affording gaming credit or other privileges to user 402 in accordance with this determination.

An authentication by secrete message, in some implementation, is conducted based at least partially on user interactions. For example, user 402 may visually observe user 404's demeanors, ask user 404 additional questions, or ask user 404 to show other proof, before providing her secrete message to user 404. In some other implementations, however, user 402 wirelessly transmits to her secrete message to another user. The secrete message may be a unique identifier of user 402 or her smartphone 462, for example, the personal telephone number of user 402.

Figure 5A:
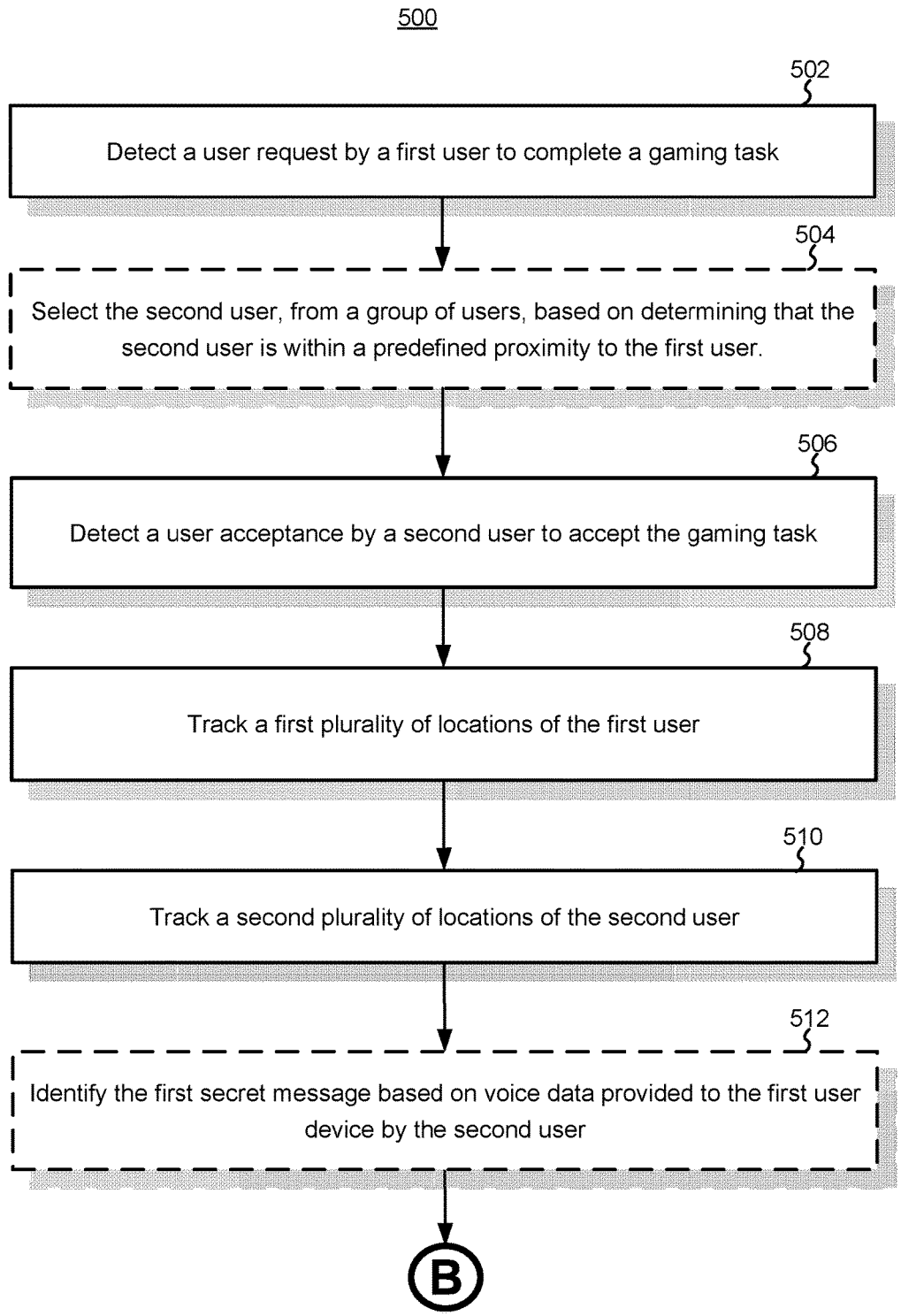
FIGS. 5A-5B are flow charts illustrating an example method for authenticating a user based on location and keyword in accordance with some implementations.
Figure 5B:
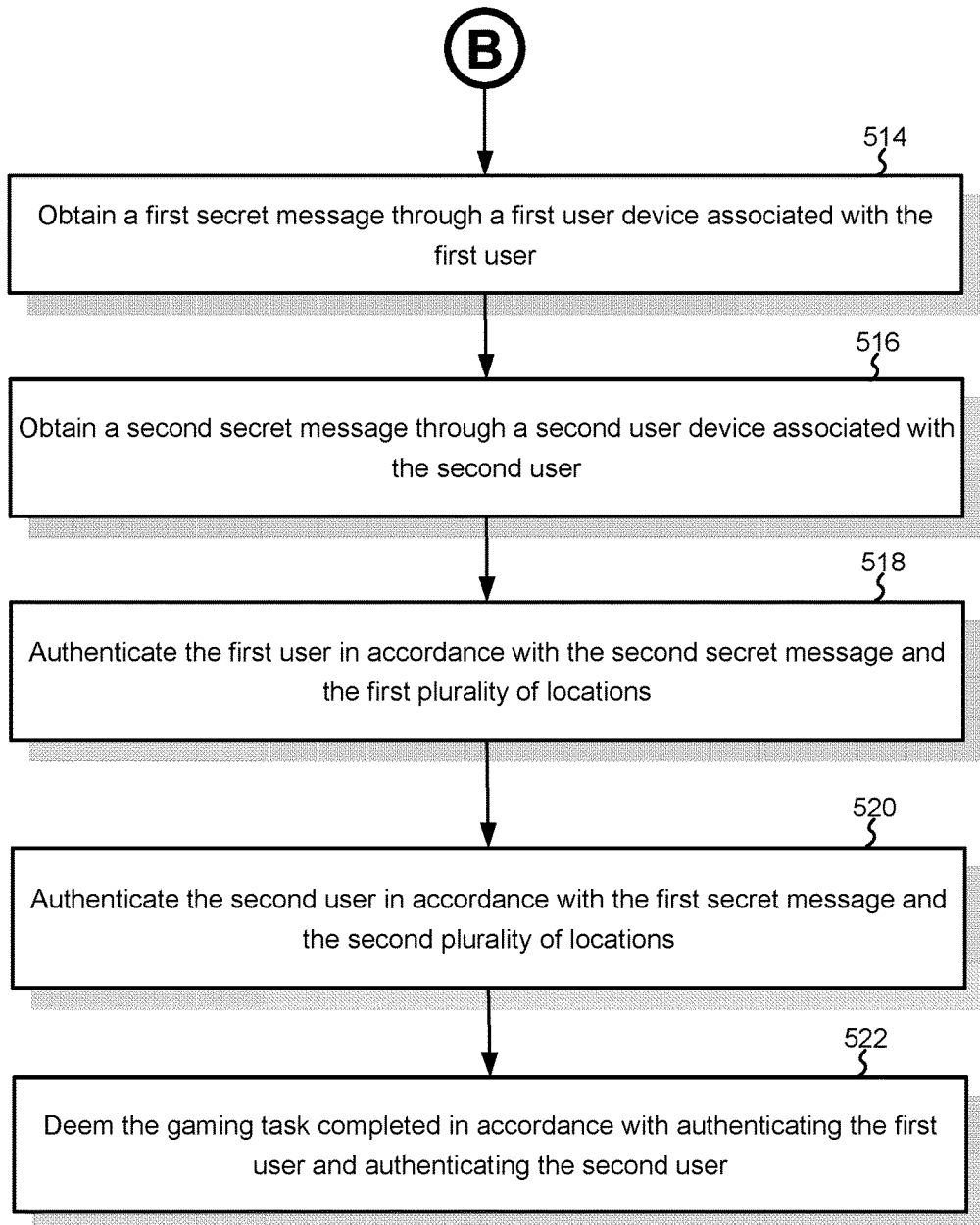

FIGS. 5A-5B are example flow charts illustrating a method 500 for authenticating a user based on location and keyword, in accordance with some implementations.

A method for authenticating a user, in some implementations, includes, at a computing device, detecting (502) a user request by a first user to complete a gaming task; detecting a user acceptance by a second user to accept the gaming task; tracking (508) a first plurality of locations of the first user; tracking (510) a second plurality of locations of the second user; obtaining (514) a first secrete message through a first user device associated with the first user; obtaining (516) a second secrete message through a second user device associated with the second user; authenticating (518) the first user in accordance with the second secrete message and the first plurality of locations; authenticating (520) the second user in accordance with the first secrete message and the second plurality of locations; and deeming (522) the gaming task completed in accordance with authenticating the first user and authenticating the second user.

The method, in some implementations, further comprises: selecting (504) the second user, from a group of users, based on determining that the second user is within a predefined proximity to the first user or based on determining that the second user is within a predefined proximity to a designated meeting location. In some implementation, the gaming system 106 may detect that two or more users are requesting to participate in a gaming task at about the same time, e.g., 5 seconds or 2 minutes apart from each other. In these cases, the gaming system 106 may match these users, e.g., determining whether to place these users in a same gaming task, in accordance with considerations such as shared interest, gender, age, and relative distance from each other. Obtaining the first secrete message through the first user device associated with the first user, in some implementations, includes: wirelessly transmitting the first secrete message, from the second user device, to the first user device.

Wirelessly transmitting the first secrete message, from the second user device, to the first user device, in some implementations, includes transmitting the first secrete message through a BLUETOOTH connection, a BLUETOOTH Low Energy (BLE) connection, an NFC connection, an Infrared connection, or a Wi-Fi connection, between the first user device and the second user device. In some implementations, countersigns and secrete messages may be transmitted in the form of a QR code. For example, a user may transmit a countersign or a secrete message to another user by having the other user scan a QR code or OCR a photo/video displayed on her mobile device.

The gaming task, in some implementations, includes requesting the first user and the second user to proceed to a same geographical location. The first user proceeding to the same geographical location, in some implementations, includes a route along the first plurality of locations. Merchants may bid with the gaming system 410 to have their commercial establishments designated as meeting locations or have a travel route includes their commercial establishments. Additionally, merchants can bid to have their commercial establishments designated as locations where game participants' location must be tracked as part of a user authentication process. These technologies would increase the exposure of the merchant's commercial establishment to game participants and may result in increased customer traffic and sales to the merchants.

The method, in some implementations, further comprises: selecting the same geographical location from a plurality of predefined geographical locations in accordance with one or more system-defined criteria.

The method, in some implementations, further comprises: selecting the same geographical location, from a group of geographical locations, based on determining that the same geographical location is within a predefined proximity to a location associated with the user request.

The method, in some implementations, further comprises: identifying (512) the first secrete message based on voice data provided to the first user device by the second user. For example, a user may provide her secrete message to another user by speaking the secrete message into the other user's smartphone. The gaming system may retrieve the voice data and transcribe the voice data into characters, words, or phrases, before determining whether the secrete message is a correct secrete message.

The gaming task, in some implementations, specifies that the first user performs a predefined action that requires participation by the second user. To encourage user interactions, for example, a gaming task may require that two game participants take a photo together or conduct a conversation obtain certain type of information from each other, e.g., a user's zodiac sign, date of birth, state of origin, movie preference, or work address. The gaming system may compare information obtained by a game participant from another game participant with information stored in the user profile of the other game participant and notify the game participant that such information is probably accurate or not. By these ways, game participants may have to intensively interact with each other and exchange truthful information in order to complete a gaming task. Furthermore, the process in which a user provide her user data to another user's device, where the user data is uploaded to a server and compared against the user's profile, which included data provided by the user in the first place, strengthens the level of authentication provided.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first user could be termed a second user, and, similarly, a second user could be termed a first user, without changing the meaning of the description, so long as all occurrences of the "first user" are renamed consistently and all occurrences of the "second user" are renamed consistently. The first user and the second user are both users, but they are not the same user.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
    at a computing device having one or more processors and memory storing one or more programs for execution by the one or more processors:
    selecting a same geographical location from a plurality of predefined geographical locations in accordance with one or more system-defined criteria;
    detecting a user request by a first user to complete a gaming task, wherein the gaming task includes requesting the first user and the second user to proceed to the same geographical location and wherein the first user proceeding to the same geographical location includes a route along the first plurality of locations;
    detecting a user acceptance by a second user to accept the gaming task;
    tracking a first plurality of locations of the first user;
    tracking a second plurality of locations of the second user;
    obtaining a first keyword through a first user device associated with the first user;
    obtaining a second keyword through a second user device associated with the second user;
    authenticating the first user in accordance with the second keyword and in accordance with the first plurality of locations tracked;
    authenticating the second user in accordance with the first keyword and in accordance with the second plurality of locations tracked; and
    deeming the gaming task completed in accordance with authenticating the first user and authenticating the second user.

2. The method of claim 1, wherein obtaining the first keyword through the first user device associated with the first user includes: wirelessly transmitting the first keyword, from the second user device, to the first user device.

3. The method of claim 1, further comprising: selecting the second user from a plurality of users in accordance with a match between interest profiles or personal information of the first user and the second user.

4. The method of claim 1, wherein wirelessly transmitting the first keyword, from the second user device, to the first user device includes transmitting the first keyword through a BLUETOOTH connection, a WIFI connection, a NFC connection, an Infrared connection or optical recognition such as Optical Character Recognition, Quick Response Code between the first user device and the second user device.

5. The method of claim 1, further comprising: selecting the same geographical location, from a group of geographical locations, based on determining that the same geographical location is within a predefined proximity to a location associated with the user request.

6. The method of claim 1, further comprising: identifying the first keyword based on voice data provided to the first user device by the second user.

7. The method of claim 1, wherein the gaming task specifies that the first user performs a predefined action that requires participation by the second user.

8. The method of claim 1, further comprising: selecting the second user, from a group of users, based on determining that the second user is within a predefined proximity to the first user.

9. A computing system, comprising:
    one or more processors;
    memory; and
    one or more programs, wherein the one or more programs are stored in the memory and configured to be executed by the one or more processors, the one or more programs including instructions for:
    selecting a same geographical location from a plurality of predefined geographical locations in accordance with one or more system-defined criteria;
    detecting a user request by a first user to complete a gaming task, wherein the gaming task includes requesting the first user and the second user to proceed to the same geographical location and wherein the first user proceeding to the same geographical location includes a route along the first plurality of locations;
    detecting a user acceptance by a second user to accept the gaming task;
    tracking a first plurality of locations of the first user;
    tracking a second plurality of locations of the second user;
    obtaining a first keyword through a first user device associated with the first user;
    obtaining a second keyword through a second user device associated with the second user;
    authenticating the first user in accordance with the second keyword and in accordance with the first plurality of locations tracked;
    authenticating the second user in accordance with the first keyword and in accordance with the second plurality of locations tracked; and
    deeming the gaming task completed in accordance with authenticating the first user and authenticating the second user.

10. The system of claim 9, the one or more programs further including instructions for: selecting the same geographical location, from a group of geographical locations, based on determining that the same geographical location is within a predefined proximity to a location associated with the user request.

11. The system of claim 9, wherein obtaining the first keyword through the first user device associated with the first user includes: wirelessly transmitting the first keyword, from the second user device, to the first user device.

12. The system of claim 9, the one or more programs further including instructions for: selecting the second user from a plurality of users in accordance with a match between interest profiles or personal information of the first user and the second user.

13. The system of claim 9, wherein wirelessly transmitting the first keyword, from the second user device, to the first user device includes transmitting the first keyword through a BLUETOOTH connection, a WIFI connection, a NFC connection, an Infrared connection or optical recognition such as Optical Character Recognition, Quick Response Code between the first user device and the second user device.

14. The system of claim 9, the one or more programs further including instructions for: identifying the first keyword based on voice data provided to the first user device by the second user.

15. The system of claim 9, wherein the gaming task specifies that the first user performs a predefined action that requires participation by the second user.

16. The system of claim 9, the one or more programs further including instructions for: selecting the second user, from a group of users, based on determining that the second user is within a predefined proximity to the first user.

17. A non-transitory computer readable storage medium storing one or more programs, the one or more programs comprising instructions, which when executed by a computing system with one or more processors, cause the computing system to execute a method of:
   selecting a same geographical location from a plurality of predefined geographical locations in accordance with one or more system-defined criteria;
   detecting a user request by a first user to complete a gaming task, wherein the gaming task includes requesting the first user and the second user to proceed to the same geographical location and wherein the first user proceeding to the same geographical location includes a route along the first plurality of locations;
   detecting a user acceptance by a second user to accept the gaming task;
   tracking a first plurality of locations of the first user;
   tracking a second plurality of locations of the second user;
   obtaining a first keyword through a first user device associated with the first user;
   obtaining a second keyword through a second user device associated with the second user;
   authenticating the first user in accordance with the second keyword and in accordance with the first plurality of locations tracked;
   authenticating the second user in accordance with the first keyword and in accordance with the second plurality of locations tracked; and
   deeming the gaming task completed in accordance with authenticating the first user and authenticating the second user.

18. The non-transitory computer readable storage medium of claim 17, the one or more programs further including instructions for: identifying the first keyword based on voice data provided to the first user device by the second user.

19. The non-transitory computer readable storage medium of claim 17, wherein the gaming task specifies that the first user performs a predefined action that requires participation by the second user.

20. The non-transitory computer readable storage medium of claim 17, the one or more programs further including instructions for: selecting the second user, from a group of users, based on determining that the second user is within a predefined proximity to the first user.

* * * * *